United States Patent Office

3,503,842
Patented Mar. 31, 1970

3,503,842
ORIENTED POLYPROPYLENE-POLYETHYLENE FILM LAMINATE HAVING A VINYL ESTER COPOLYMER COATING
Harry A. Kahn, Monroe, Conn., assignor to National Distiller and Chemical Corporation, New York, N.Y., a corporation of Virginia
No Drawing. Filed June 12, 1964, Ser. No. 374,831
Int. Cl. B32b 5/16, 27/32, 27/08
U.S. Cl. 161—162       4 Claims

ABSTRACT OF THE DISCLOSURE

A plastic film laminate having increased stiffness and improved heat sealability comprising an oriented polypropylene-polyethylene film laminate having the exposed surface of the polyethylene film coated with a copolymer of a vinylester and an ethylenically unsaturated organic acid having up to six carbon atoms.

---

This invention relates to an improved polypropylene film product. More particularly, the invention pertains to a laminate formed from oriented polypropylene and a different thermoplastic film or films wherein the outer surfaces of the latter are coated.

In recent years oriented polypropylene film has been proposed for a variety of uses such as packaging and the like. The transparency and resistance to moisture vapor transmission characteristics of oriented polypropylene are particularly advantageous in the packaging of moist foods. It is also known that oriented polypropylene is markedly superior to unoriented polypropylene in properties such as tensile modulus, tensile strength, elongation, impact strength, etc. Orientation of the polypropylene film is achieved, in general, by heating the film and stretching it in a longitudinal direction or a transverse direction or both. The film retains its stretched configuration upon cooling, and the change in the polymer molecules from a random position distribution to alignment in the direction of orientation results in a marked improvement in film properties.

Certain commercial disadvantages have arisen with respect to the use of oriented polypropylene film. For one thing, because of stiffness requirements the oriented polypropylene film must be much thicker than would ordinarily be required to obtain other desirable or necessary physical properties. In other words, certain minimum thickness of the oriented polypropylene film must be employed in order to achieve the requisite stiffness. Obviously it would be highly desirable to employ less of the relatively expensive oriented polypropylene film while attaining comparable stiffness values. Another disadvantage of the oriented polypropylene resides in its comparatively narrow heat sealing temperature range. Although the ability of unoriented polypropylene to adhere to itself by the application of heat and pressure, i.e., heat sealability, necessary in converting the film to packages is generally satisfactory, orientation of the polypropylene film deleteriously affects this property. Consequently, when oriented polypropylene film is heated to its film softening point in order to achieve sealing, the polypropylene molecules return to their original, random position distribution which causes the film to shrink, pucker and tear. This phenomenon, inherent in oriented polypropylene film, creates serious commercial problems during conventional heat sealing operations. Previous treatments which have been proposed in order to eliminate these difficulties have included the coating of the oriented polypropylene film with heat sealable materials such as polyvinylidene chloride or polyvinyl acetate and nitrocellulose as well as many other materials known to the art. It has been found, however, that the application of such coating to the surface of the oriented polypropylene film also has a number of serious commercial drawbacks. For example, it was found that oriented polypropylene film is embrittled by such coatings. Whereas the uncoated oriented polypropylene film may have a tensile impact strength within the range of about 1,200 to 1,500 ft. lbs. per cubic inch, after coating the tensile strength is reduced to as low as 200 to 400 ft. lbs. per cubic inch. Moreover, it was found that conventional surface treatment of the oriented polypropylene film, e.g. the so-called electrical or corona discharge treatment, to insure adhesion of the coating proved to be ineffective. More drastic and expensive special surface treatments such as chlorination, oxidation, ultraviolet light, etc. are essential. Although it is possible to apply primer coatings such as poly(ethylenimine) or various adhesives to the oriented polypropylene film surface to achieve the necessary degree of coating adhesion, such treatments have the disadvantage of being expensive and time consuming.

One object of the present invention is to provide an improved oriented polypropylene film product which has a wide heat sealing temperature range and other properties normally associated with oriented polypropylene film.

Another object of the present invention is to provide an improved oriented polypropylene film product which utilizes a thinner oriented polypropylene film without the attendant loss in stiffness characteristics.

A further object of the present invention is to provide an improved oriented polypropylene film product having an outer coated surface which does not require a drastic surface treatment to insure adequate adhesion of the coating.

These and other objects of the present invention will become readily apparent from the ensuing description and illustrative embodiments.

In accordance with the present invention, it has now been found that an improved oriented polypropylene film product can be attained by forming a laminate of oriented polypropylene film with a different thermoplastic film, preferably polyethylene film. It will be understood either one or both surfaces of the oriented polypropylene film may be laminated with the polyethylene film or films.

Although various coating compositions may be employed in carrying out the method of this invention, the preferred compositions comprise a copolymer of a vinyl ester such as vinyl acetate, vinyl propionate, vinyl butyrate and the like, the organic acid group having from 2 to 8 carbon atoms, together with an unsaturated organic acid. The unsaturation should be carbon to carbon ethylenic unsaturation. The organic acid may have up to six carbon atoms such as acrylic, crotonic, isocrotonic, methacrylic, tiglic and angelic. Other useable unsaturated organic acids include the lower alkyl monoesters of dibasic acids such as monomethyl, monoethyl, monobutyl maleates, fumarates, itaconates or citraconates and the like as well as mixtures of the foregoing.

The copolymers of greatest interest are characterized by having solution viscosities in the range of 5 to 30 centipoises (cps.) for molar solutions in ethanol. The viscosity values for the copolymers are preferably but not necessarily in this range.

Such copolymers are available commercially and are used for a number of purposes and their modes of preparation are well known. For example, processes for producing these polymer materials are shown in U.S. Patents 2,263,598; 2,317,725; 2,657,187; 2,643,245; 2,657,189; 2,816,877; 2,643,246 and others.

The copolymers of vinyl acetate with crotonic acid, or a monoester of maleic acid, particularly monoesters of alcohols of 1 to 8 carbon atoms are preferred for the preparation of the coatings because of their availability, relative ease of solution in mildly alkaline aqueous solutions, relative ease of film formation and good heat sealability over a wide temperature range to form peelable seals.

Since it is desirable that the copolymers employed be soluble or dispersable in aqueous alkaline solution, the acid comonomer should constitute from 2 to 15% by weight of the copolymer, with the vinyl ester comonomer constituting the remaining 85 to 98% by weight. The copolymer must be capable of application from such aqueous solution. Vinyl acetate-crotonic acid copolymers are particularly satisfactory for the purposes herein described, because of their ready solubility and excellent film formation. The copolymer must form a strong bond with the thermoplastic surfaces.

As previously discussed, it is necessary to "activate" or pretreat the exposed surface of the polyethylene film to be coated in order to improve specific adhesion thereto. If such a treatment is not carried out, the resulting copolymer coating is not strongly adherent and can be stripped or peeled from the polyethylene substrate. This so-called activation prepares the film surface and renders it properly adhesive for the polymeric coating to adhere thereto. The activation or treatment may be done in a variety of ways known to the art. These methods for improvement of adhesive bonding of thermoplastic or polyolefin films include chemical treatments as with chromic acid, treatment by subjecting to a blast of hot air, flame contact treatment, and high voltage electrical or corona discharge treatment. Although any of the above methods can be used, the electrical or corona discharge treatment of the polyethylene surface to improve the adhesive bonding is preferred for this purpose.

In most instances, and to achieve the best results, the coating of the laminate with the coating composition is done from an aqueous solution containing the copolymer substance. The copolymer is dissolved in dilute ammonia or in the aqueous solution of a volatile amine such as aliphatic amines, alkylol amines and the like. The ammonia or amine salt being soluble in cold, warm or hot water, is also further compounded and mixed with other agents as described, and as hereinafter disclosed.

The solution preferably in aqueous form is then applied to the treated polyethylene surface in any convenient and known manner, as by dipping, spraying, brushing, roll coating, gravure coatings, etc., preferably at a temperature of 60–150° F. The excess aqueous solution may be removed by squeeze rolls, doctor knives, etc. The coating composition should be applied in such amount that there will be deposited upon drying, a smooth evenly distributed layer of from 0.02 to 0.5 mill thickness, a thickness of from about 0.05 to 0.10 mil being preferred. The thickness of applied coating is sufficient to impart the desired heat sealability to the polyolefin film structures.

The coating on the polyethylene surface is subsequently dried by hot air, radiant heat or by any other convenient means. Upon drying, the ammonium or amine salt of the copolymer is decomposed, evolving the volatile ammonia or amine and leaving a non-water soluble, clear, adherent, glossy coated polyolefin, such as for instance a wrapping material or film.

In some instances it has also been found advantageous to add hot slip agents and anti-blocking agents to the coating compositions. One of the preferred hot slip agents is a solid, finely divided, water isoluble, inorganic material such as colloidal silica. Other finely divided inorganic materials which can be used to enhance slip properties include such water insoluble solids as diatomaceous earth, calcium silicate, bentonite and finely divided clays. In order to function most efficiently, it is desirable that this finely divided inorganic material have a particle size between 10 and 200 millimicrons, an alkali stabilized silicia dispersion being the preferred material. In general, it is preferred to use from about 35 to 60% by weight, based on the weight of the copolymer, of the slip agent.

Anti-blocking materials which may be used include finely divided waxes and wax-like materials which melt at temperatures above the maximum temperatures encountered in the storage of the film and are not soluble in the copolymer at these temperatures. Specific examples are natural waxes such as paraffin wax, microcrystalline wax, beeswax, carnauba wax, japan wax, montan wax, etc., and synthetic waxes such as hydrogenated castor oil, chlorinated hydrocarbon waxes, long chain fatty acid amides, etc. Only minor proportions of the anti-blocking agent, sufficient in amount to impart the desired anti-block characteristics, need be employed. It has been disclosed that the hot slip agent, e.g. alkali stabilized silica, will also function as an anti-blocking agent.

It has also been found necessary to employ a copolymer coating composition with a heat sealing temperature at least below the softening or melting point of the laminate to which the coating is applied. More specifically, it is preferred that the copolymer composition described above be capable of forming a cohesive bond at temperatures below which the laminate structure becomes distorted. Obviously, these temperatures will vary somewhat depending upon the type of thermoplastic films employed in preparing the laminates of this invention.

The coating compositions described above are disclosed in U.S. Patent No. 3,088,844, and it will be understood therefore that the exact formulation of the coating composition is not an essential feature of the present invention.

It will also be understood that the exact method of preparing the oriented polypropylene—polyethylene film laminate is not an essential feature of the present invention. One method which may be effectively employed involves first intimately contacting at least one surface of a polypropylene base film, which serves as the laminate core, with polyethylene film. The polypropylene film generally has a thickness or gauge of about 1 to 20 mils, preferably about 4 to 10 mils; while the polyethylene film has a thickness of about 0.3 to 2.5 mils, preferably about 0.5 to 1.0 mils. The films are preferably secured together by bringing them into intimate contact while simultaneously heating them at a temperature within the range of about 140° to 200° F., to insure sufficient contact without the inclusion of air, gas or any foreign material. In the most preferred method of operation, both sides of the polypropylene are intimately contacted with polyethylene films. The resulting combination of film layers are subsequently stretched in a longitudinal direction or in a transverse direction or in both longitudinal and transverse directions in stretch ratio(s) sufficient to achieve a high degree of interfacial bonding between the film layers and thereby form the desired laminate structure, which is not readily delaminated or subject to separation by physical means. A transverse stretch ratio of about 8:1, for example, has been effectively employed to produce such a laminate structure.

The gauge of the resulting laminate is obviously dependent upon the thickness of the starting materials and the stretch ratios employed to achieve the desired degree of bonding between the film layers or laminae. In turn these variables are dependent upon the end use applications of the laminate structure. In packaging film applications, for example, the gauge of the laminate may range from about 0.5 to 5 mils, and preferably from about 0.7 to 1.5 mils. As previously noted, the laminates produced in accordance with the method of this invention have a thin, adherent layer of polyethylene film on both sides of a polypropylene film core. For packaging applications the thickness of the polyethylene layers of laminae, following stretching, may range from about 0.02 to 1.0 mil, preferably from about 0.05 to 0.2 mil. Consequently, the outer polyethylene laminae may comprise only a minor proportion of the total weight of the laminate product.

As is known in the art, oriented polyolefin film can be produced by stretching initially in a longitudinal direction and then in a transverse direction. If balanced biaxial orientation is desired, the transverse direction stretching may be followed by a second longitudinal stretching step. In the lamination method of this invention, the polyethylene films may be brought into intimate contact with the polypropylene film core prior to stretching the latter in any direction in order to form the desired laminate structure.

In accordance with one method of carrying out the lamination, polypropylene film produced by any of the known methods such as extrusion into a water bath, is contacted with polyethylene films which cover both the top and bottom surfaces of the polypropylene film. The polypropylene films may also be produced by procedures well known to the art such as the so-called casting process. Tubular extrusion of polypropylene by itself or in combination with a concentric tube of polyethylene may be employed to form the starting material for the lamination steps. For some purposes, it may be desirable to stretch the polypropylene film in a longitudinal direction, either during its production or subsequent thereto, prior to its contact with the polyethylene film. Under such conditions, the initial combination of polyethylene and polypropylene films is stretched in a transverse direction to produce a laminate product having biaxially oriented polyethylene film surfaces. As noted above, if balanced biaxially oriented polyethylene film surfaces are desired, the laminate is subsequently subjected to a longitudinal stretching step.

For most purposes, however, an unoriented polypropylene film is employed for forming the initial film combination. In such cases, the resulting combination of polyethylene and polypropylene films is subjected to sequential longitudinal and transverse stretching steps to produce laminates within the scope of this invention. Balanced biaxial orientation can also be achieved here by employing a second longitudinal step subsequent to the transverse stretching step.

It will be understood that the polyethylene and polypropylene films brought into intimate contact are initially heated, for example, by passing them through a heated oven or over a heated roller or a series of rollers. This preheating enhances the adherence and contacting of the polyolefin or thermoplastic film layers when they are brought into intimate contact to permit subsequent processing of the composite film structure operations. Moreover, this initial bonding of the film layers helps prevent the entrapment of air between the layers during the combining step and minimizes separation of the layers during handling of the composite film structure prior to the stretching steps. This also insures complete and uniform welding of the films. During actual experiments, it has been observed that the composite film structure which results from this initial step may be quite easily separated into film layers simply by manual stripping. Obviously film interlayer adhesion at this stage of the lamination method is extremely poor.

Although it has previously been noted that a sequention stretching operation comprising the steps of first imparting a longitudinal orientation to the composite film structure followed by a transverse orientation can be effectively employed to produce the desired laminate products of this invention, it will be understood that other methods of orientation can be effectively employed. Laminar extrusion techniques could be employed as well as such other methods as simultaneous biaxial orientation wherein the composite film structure initially formed is stretched longitudinally and transversely at the same time as described in U.S. Patent No. 3,048,895.

The invention will be more fully understood by reference to the following specific embodiment, which is presented for purposes of illustrating the broad concepts of this invention.

EXAMPLE

In the following runs polypropylene film was extruded by conventional means and, where indicated, brought into intimate contact with polyethylene film to form a laminate. It will be understood that the polyethylene and polypropylene films brought into intimate contact are initially heated, for example, by passing them through a heated oven or over a heated roller or a series of rollers. The resulting film was then longitudinally oriented by stretching over a series of slow and fast rolls to obtain a stretch ratio of about 1.4 to 1. The longitudinally stretched film laminate was next passed to a tenter frame and oriented in the transverse direction by stretching to a ratio of 8 to 1. After leaving the tenter frame, the polypropylene film or the laminate was passed through a set of trim knives for removal of the unstretched edges which were held in the tenter frame clips.

The coating was carried out by the use of a typical gravure procedure. The aqueous coating composition contained about 12.35% of a copolymer composed of 95% vinyl acetate and 5% crotonic acid, the copolymer having a solution viscosity in ethanol of 10 cps., 0.21% of 28% ammonia water, 17.50% of a 30% solids alkali stabilized aqueous dispersion of colloidal silica with particles ranging from 17 to 170 millimicrons, 0.37% of a 33% solids aqueous dispersion of carnauba wax having an average particle size of 1–10 microns with the remainder of the coating composition being water. As indicated in the table below, the film, prior to coating, was treated by exposure to an electric corona discharge with an electrode current of 1.01 amperes per foot of film width and at a film rate of about 70 feet per minute.

TABLE

|  | 1 | 2 | 3 | 4 |
| --- | --- | --- | --- | --- |
|  | Uncoated [1] OPP | Coated [1] OPP | Uncoated PE-OPP-PE | Coated PE-OPP-PE |
| Thickness, (mils) coating | | 0.08 | | 0.08 |
| Oriented polypropylenes | 0.7 | 0.7 | 0.56 | 0.56 |
| Polyethylene | | | 0.14 | 0.14 |
| Total stiffness (Handleometer units) | 7.5 | 9 | 7 | 9 |
| Tensile impact strength, ft. lbs./cu. in | 1,250 | 400 | 1,650 | 1,700 |
| Adhesion of coating T.D., g./in. when sealed at 260° F | | 50 | | 200 |
| Heat sealing range, ° F | 295-300 | 220-300 | 240-290 | 220-300 |
| Optical appearance haze, percent Gardner | 2 | 1.5 | 2.5 | 2.0 |
| Gloss, percent Gardner | 82 | 85 | 80.0 | 84.0 |
| Hot slip properties | (2) | (3) | (2) | (3) |
| Treatment prior to coating | | (4) | | (4) |

[1] The polypropylene film was extruded, laminated to the polyethylene, longitudinally oriented, oriented in the transverse direction, exposed to corona discharge to activate the polyethylene, and then coated. Of course, for the uncoated PE-OPP-PE, no coating is applied thereto.
[2] Inadequate.
[3] Adequate.
[4] Corona discharge.

The above data show that outstanding oriented polypropylene film products can be prepared by utilizing the present invention. A comparison of Film No. 1 with Film No. 2 reveals that oriented polypropylene is embrittled by coatings, whereas Film No. 4 shows no embrittlement when the oriented polypropylene film is laminated with polyethylene, oriented and then coated. The superior adhesion achieved when the coating is applied to the laminate film product rather than to the oriented polypropylene film is demonstrated by a comparison of Film No. 2 with Film No. 4. The data also show that although Film No. 3 has satisfactory impact strength and stiffness; the coated laminate, Film No. 4, has superior optical appearance, hot slip properties, and heat sealing temperature range. In addition, these outstanding results are attained despite the fact that the thickness of the oriented polypropylene film core in the oriented laminate is much less than that which is ordinarily employed (Film Nos. 1 and 2).

While particular embodiments of this invention are shown above, it will be understood that the invention is obviously subject to variations and modifications without departing from its broader aspects. For example, other laminating procedures may be employed and various other thermoplastic films may be employed in place of the polyethylene. Such other films include polyethylene copolymers, polyallomers, polystyrene, polyvinyl chloride, polyvinylidene chloride, polyvinyl alcohol, and the like. It should be noted, however, that the thermoplastic film employed in the laminate need not be heat sealable, since the heat sealing characteristics of the final film product will be imparted by the coating. Moreover, the use of the coating permits the employment of off grade or scrap polypropylene and other thermoplastic materials in the manufacture of the laminate structure. As previously discussed, the use of polyethylene in conjunction with the oriented polypropylene film is especially preferred, since the resulting coated laminate film product has been found to have outstanding properties.

What is claimed is:
1. A coated plastic film laminate comprising a polypropylene film, having a thickness of about 0.4 to 1.5 mil, bonded in the absence of adhesives, to polyethylene films, on its top and bottom surfaces, each of said films in the composite laminate being biaxially oriented, the polyethylene films each having a thickness of about 0.02 to 1.0 mil, both of the exposed surfaces of the polyethylene films being coated with from about 0.02 to about 0.5 mil of a coating composition consisting essentially of a copolymer of about 85 to 98% by weight of a vinyl ester selected from the group consisting of vinyl acetate, vinyl propionate and vinyl butyrate, and about 2 to 15% by weight of an ethylenically unsaturated acid having up to 6 carbon atoms, said coating being capable of forming a cohesive bond at temperatures below the temperatures at which the laminate becomes distorted, said coated laminate having increased stiffness, improved heat sealability and improved resistance to embrittlement.

2. The coated plastic film laminate of claim 1 wherein said coating composition also contains a siliceous material, said siliceous material having a particle size between 10 and 200 millimicrons and comprising from 35 to 60% by weight, based on the weight of the copolymer of the coating.

3. The coated plastic film laminate of claim 1 wherein said coating composition also contains an anti-block agent and wherein said anti-block agent is wax.

4. The coated plastic film laminate of claim 2 wherein said siliceous material is silica.

References Cited

UNITED STATES PATENTS

| 2,932,323 | 4/1960 | Aries | 156—244 |
| 2,956,723 | 10/1960 | Tritsch | 161—252 |
| 3,088,844 | 5/1963 | Hungerford et al. | |
| 3,294,621 | 12/1966 | Baird et al. | 161—247 |
| 3,223,761 | 12/1965 | Raley | 264—95 |
| 3,397,101 | 8/1968 | Rausing | 264—290 |

ROBERT F. BURNETT, Primary Examiner

R. J. ROCHE, Assistant Examiner

U.S. Cl. X.R.

117—138.8, 161; 161—165, 252, 254, 411, 206